United States Patent
Caraway

[15] 3,693,465
[45] Sept. 26, 1972

[54] RECIPROCATORY MOTION MECHANISM WITH INTERCONNECTED DUAL ACTUATORS

[72] Inventor: Guy C. Caraway, 9703 Wiley Burke Ave., Downey, Calif. 90240

[22] Filed: Nov. 27, 1970

[21] Appl. No.: 93,046

[52] U.S. Cl. ................................................. 74/110
[51] Int. Cl. ............................................. F16h 21/44
[58] Field of Search ....... 74/110, 89.21, 89.22, 242.1; 226/62, 67; 72/89.2

[56] References Cited

UNITED STATES PATENTS

| | | | |
|---|---|---|---|
| 3,496,918 | 2/1970 | Finlay | 74/242.11 |
| 3,202,000 | 8/1965 | Fischer | 74/89.22 |
| 396,430 | 1/1889 | Reichel | 74/89.22 |
| 926,034 | 6/1909 | Thomas | 74/110 F |
| 2,327,135 | 8/1943 | Scott | 74/110 |
| 3,103,701 | 9/1963 | Calchera et al | 74/110 |
| 559,082 | 4/1896 | McDermott | 74/110 |

FOREIGN PATENTS OR APPLICATIONS

| | | | |
|---|---|---|---|
| 1,085,597 | 7/1960 | Germany | 74/110 |

Primary Examiner—William F. O'Dea
Assistant Examiner—Wesley S. Ratliff, Jr.
Attorney—Harris, Kiech, Russell & Kern

[57] ABSTRACT

A film advancing mechanism comprising a cable, a claw connected to the midpoint of the cable and movable laterally of the direction of the cable, a return spring connected to the claw and tending to bow the cable, and means for pulling on the cable on opposite sides of the claw to tend to straighten the cable and thus displace the claw laterally to advance a film engaged thereby. The pulling means comprises oppositely moving solenoid armatures or cam followers connected to the ends of the cable, or oppositely moving pulleys around which the cable is trained.

8 Claims, 3 Drawing Figures

PATENTED SEP 26 1972 3,693,465
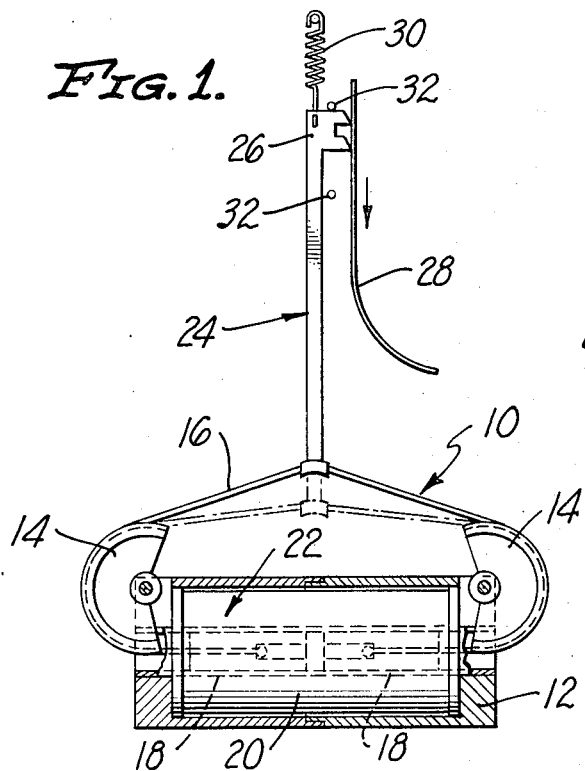
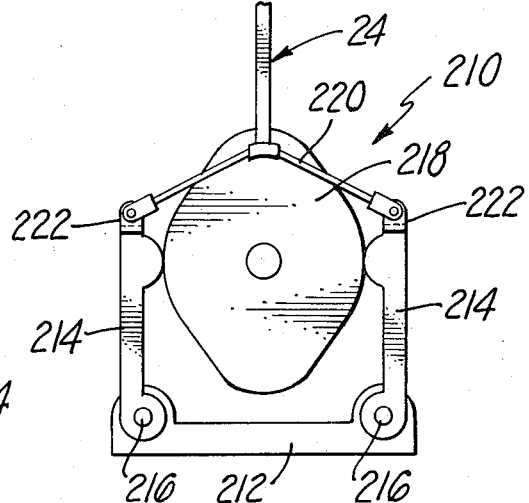
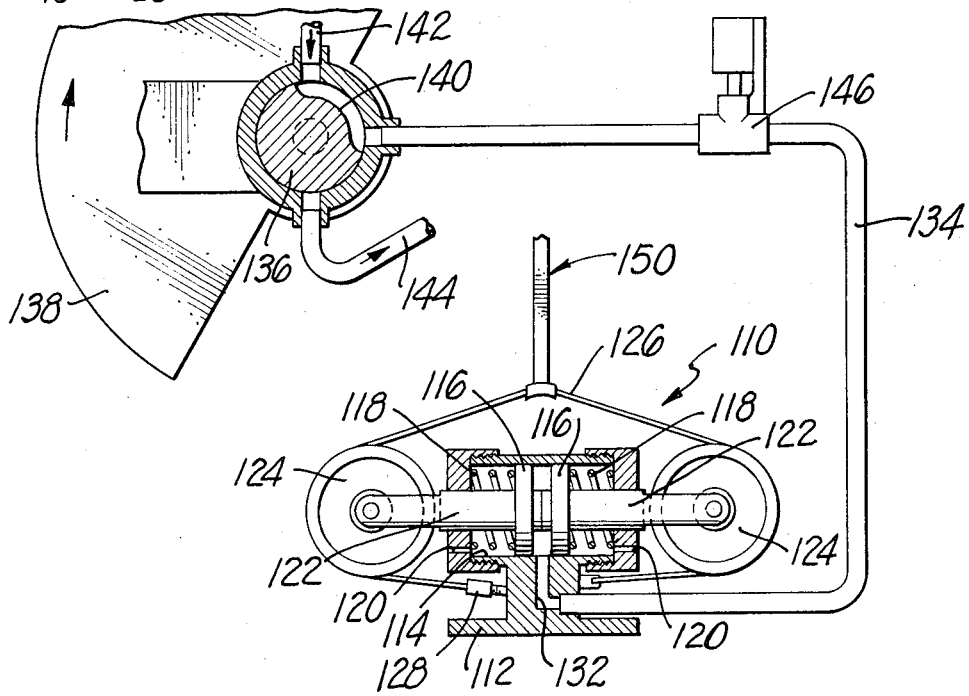
INVENTOR
GUY C. CARAWAY
BY HIS ATTORNEYS
HARRIS, KIECH, RUSSELL & KERN

3,693,465

RECIPROCATORY MOTION MECHANISM WITH INTERCONNECTED DUAL ACTUATORS

BACKGROUND OF INVENTION

The present invention relates in general to an intermittent motion mechanism and, more particularly, to a mechanism which produces reciprocatory motion.

The invention may be utilized to operate any device requiring a reciprocatory motion. However, since it is particularly applicable to and was originally embodied in a mechanism for reciprocating a film advancing claw for motion picture film, it will be considered primarily in such connection herein as a matter of convenience.

SUMMARY AND OBJECTS OF INVENTION

The primary object of the present invention is to provide a stroke-multiplying reciprocatory motion mechanism which produces a relatively long output stroke with relatively short input strokes, which is conducive to higher frequency operation.

Another primary object of the invention is to provide a balanced reciprocatory motion mechanism in which vibration forces are cancelled out so that they are not transmitted to the surrounding structure.

Considering the invention more specifically, an important object thereof is to provide a reciprocatory motion mechanism having the foregoing characteristics which includes: a supporting structure or frame; a flexible member, preferably a cable, or the like; movable means connected to the flexible member and tending to bow same, such movable means including a film advancing claw, or other device to be reciprocated; dual pulling means for pulling on the cable on opposite sides of the movable means and in opposite directions so as to tend to straighten the cable and thereby displace the movable means laterally of the direction of the cable; and means for actuating the pulling means. A related object is to provide a movable means which includes a return means, such as a return spring, for returning the reciprocatory device to its initial position each time the tension in the cable is relaxed.

With a dual actuator system of the foregoing nature, a relatively large stroke for the movable means is achieved with relatively short strokes for the two pulling means, which permits higher frequency operation. Also, since two opposed pulling means are utilized, vibration forces are cancelled to avoid transmitting them to the supporting structure or frame.

An object in connection with one embodiment of the invention is to provide a mechanism wherein the dual pulling means or actuators are solenoid armatures connected to the ends of the cable and actuated by a single solenoid coil, the cable being trained around pulleys to permit utilization of a single coil to actuate the two armatures.

An object in connection with another embodiment of the invention is to provide a pneumatic or hydraulic mechanism wherein the cable is straightened to displace the movable means by fluid pressure acting on opposed pistons, or the equivalent.

Still another object is to provide a cam operated mechanism wherein cam followers connected to the cable are moved in opposite directions to straighten the cable by a cam or cam means in engagement with the cam followers.

Another important feature of the cable-connected dual actuator system of the invention is that even if the actuators move nonlinearly with time, the cable acts to displace the movable means connected thereto at least substantially linearly with time.

Still another object of considerable importance is that the movable means being reciprocated is not subjected to any lateral forces by the cable-connected dual actuators. Thus, the film advancing claw, or other device being reciprocated, can be guided very simply, as by the edges of a slot, with little or no friction.

The foregoing objects, advantages, features and results of the present invention, together with various other objects, advantages, features and results thereof which will be evident to those skilled in the art of reciprocatory motion mechanisms in the light of this disclosure, may be achieved with the exemplary embodiments of the invention illustrated in the accompanying drawing and described in detail hereinafter.

DESCRIPTION OF DRAWING

In the drawing:

FIG. 1 is a semidiagrammatic view of a reciprocatory motion mechanism which embodies the invention and which is actuated electrically;

FIG. 2 is a semidiagrammatic view illustrating a pneumatically or hydraulically actuated embodiment; and FIG. 3 is a semidiagrammatic view illustrating a mechanically actuated embodiment of the invention.

DESCRIPTION OF EXEMPLARY EMBODIMENT OF INVENTION

Referring initially to FIG. 1 of the drawing, illustrated therein is a reciprocatory motion mechanism 10 of the invention which includes a supporting structure or frame 12 carrying two pulleys 14. Trained around the pulleys 14 is a cable 16, or the equivalent, the ends of which are suitably secured to opposed, coaxial solenoid armatures 18 adapted to be displaced toward each other upon energization of a coil 20 of a solenoid or solenoid means 22 carried by the frame 12.

Connected to the cable 16 midway between the pulleys 14 is a movable means 24 reciprocable laterally of the direction in which the cable 16 extends between the two pulleys. The movable means 24 may comprise any desired device to be subjected to reciprocatory the particular In particular construction illustrated, the movable means 24 includes a film advancing claw 26 engageable with apertures in a motion picture film 28 to advance same frame by frame. The claw 26 is biased toward its initial position by a tension return spring 30, the stroke of the claw being limited by stops 32.

As will be apparent, the spring 30 tends to maintain the cable 16 between the pulleys 14 in a bowed condition, as shown. Under such circumstances, the armatures 18 are spaced apart. Upon energization of the solenoid coil 20, which may be effected at the desired frequency in any suitable manner, the armatures 18 move axially inwardly toward each other to tend to straighten the cable 16, thereby displacing the movable means 24 laterally relative to the direction of the cable, i.e., downwardly as viewed in FIG. 1 of the drawing.

With the foregoing construction, relatively short strokes of the armatures 18 produce a relatively long stroke of the movable means 24 so that higher frequency operation can be achieved, which is an important feature. Also, vibration or shock forces produced by the armatures 18 are balanced against each other and cancel out so as to avoid transmitting same to the supporting structure 12. Another feature is that the displacement of the movable means 24 produced by straightening of the cable 16 between the pulleys 14 imposes no side loads on the movable means 24. Thus, the film advancing claw 26, or other device being reciprocated, can be guided very simply with little or no friction as by the edges of a guide slot, for example, not shown. Still another advantage is that the nonlinear pull of the solenoid coil 20 on the armatures 18 is compensated for by the tensioned cable 16 so as to apply at least a substantially uniform pull on the movable means 24.

Turning now to FIG. 2 of the drawing, illustrated therein is a reciprocatory motion mechanism 110 which includes a frame 112 carrying a cylinder 114 containing opposed coaxial pistons 116, or the equivalent, biased axially inwardly toward each other compression springs 118. The outer ends of the cylinder 114 are provided with vents 120 and the pistons 116 are provided with oppositely projecting coaxial rods 122 carrying pulleys 124. Trained around these pulleys is a cable 126 the ends of which are anchored to the frame 112. Preferably, at least one end of the cable 126 is anchored by a tension adjusting device 128.

Connected to the cable 126 midway between the pulleys 124 is a laterally reciprocable means 130 corresponding to the laterally movable means 24 of the mechanism 10. This means 130 tends to maintain the cable 126 bowed between the pulleys 124 in the same manner as the means 24.

To reciprocate the movable means 130, fluid under pressure is periodically introduced between the pistons 116, at the desired frequency, through a passage 132 and a line 134. As will be apparent, each pressure pulsation between the pistons 116 moves them and the pulleys 124 axially outwardly away from each other to tend to straighten the cable 126 between the pulleys, thereby displacing the movable means 130 in the same manner as the cable 16 displaces the movable means 24.

In the particular construction illustrated, the delivery of fluid under pressure into the cylinder 114 between the pistons 116 is controlled by a rotary valve 136 driven at the same speed as a rotary shutter 138 of a motion picture film projector, as by being connected to the shutter, or to the shutter shaft. As will be apparent, for each revolution of the valve 136, a port 140 therein alternately connects the line 134 to an inlet line 142 and an outlet line 144. The inlet line 142 is connected to a suitable source of fluid under pressure, and the outlet line 144 to a suitable point of discharge. If the fluid used is air, the outlet line 144 may lead to the film gate of the projector so that the exhaust air is utilized for cooling purposes.

In the construction illustrated in FIG. 2, inserted into the line 134 is an electrically operated valve 146 which may be closed to deactivate the mechanism 110 and which may be opened to activate it.

The reciprocatory motion mechanism 110 has essentially the same features and advantages as the mechanism 10 so that repetition is unnecessary.

Turning now to FIG. 3 of the drawing, illustrated therein is a reciprocatory motion mechanism 210 which also has essentially the same features and advantages as the mechanism 10. The mechanism 210 includes a frame 212 carrying oppositely oriented cam followers 214 pivotally mounted at 216. The cam followers 214 are periodically pivoted away from each other by a double-lobed cam or cam means 218. Interconnecting the cam followers 214 is a cable 220, the cam followers being provided with offsets 222 permitting the cable 220 to clear the cam 218. The midpoint of the cable 220 is connected to a laterally reciprocable means 224 which corresponds to the movable means 24 and 130 and which tends to maintain the cable 220 bowed and the cam followers 214 in contact with the cam 218.

As will be apparent, rotation of the cam 218 periodically separates the cam followers 214 to tend to straighten the cable 220, the latter, in turn, laterally displacing the movable means 224, i.e., downwardly as viewed in the drawing. The return spring, not shown, embodied in the movable means 224 effects the return stroke of the movable means.

Although exemplary embodiments of the invention have been disclosed for purposes of illustration, it will be understood that various changes, modifications and substitutions may be incorporated in such embodiments without departing from the spirit of the invention as defined by the claims appearing hereinafter.

I claim as my invention:

1. In a reciprocatory motion mechanism, the combination of:
    a. a frame;
    b. a flexible member;
    c. movable means connected to said flexible member and bowing same;
    d. two pulling means on said frame for respectively pulling on said flexible member on opposite sides of said movable means equally and in opposite directions so as to tend to straighten said flexible member and thereby displace said movable means laterally of said flexible member; and
    e. actuating means on said frame for actuating said pulling means simultaneously.

2. A mechanism as defined in claim 1 wherein said flexible member is a cable.

3. A mechanism according to claim 2 including pulleys respectively located on opposite sides of said movable means and around which said cable is trained.

4. A mechanism as set forth in claim 3 wherein said pulleys are stationarily mounted on said frame and said pulling means are connected to the ends of said cable.

5. A mechanism according to claim 4 wherein said actuating means and said pulling means comprise solenoid means having two coaxial armatures movable toward each other upon energization of said solenoid means and respectively connected to the ends of said cable.

6. A mechanism as defined in claim 3 wherein said pulleys are movably mounted on said frame for movement toward and away from each other, wherein the ends of said cable are anchored to said frame, whereby said pulleys constitute said pulling means and wherein said actuating means are connected to said pulleys and move same away from each other upon energization of said actuating means.

7. A mechanism as set forth in claim 6 wherein said actuating means comprise fluid motor means having coaxial piston means respectively connected to said pulleys.

8. A mechanism to claim 2 wherein said pulling means comprises cam followers pivoted on said frame and connected to the ends of said cable, and wherein said actuating means comprise cam means engaging said cam followers.

* * * * *

UNITED STATES PATENT OFFICE
CERTIFICATE OF CORRECTION

Patent No. 3,693,465      Dated September 26, 1972

Inventor(s) Guy C. Caraway

It is certified that error appears in the above-identified patent and that said Letters Patent are hereby corrected as shown below:

Column 2, Lines 49 and 50, "desired device to be subjected to reciprocatory the particular In particular construction illustrated, the movable" should be
--desired device to be subjected to reciprocatory motion. In the particular construction illustrated, the movable--

Signed and sealed this 29th day of May 1973.

(SEAL)
Attest:

EDWARD M. FLETCHER, JR.       ROBERT GOTTSCHALK
Attesting Officer      Commissioner of Patents